(12) United States Patent
Verma

(10) Patent No.: US 10,171,589 B2
(45) Date of Patent: Jan. 1, 2019

(54) REDUCING INTERFERENCE FROM MANAGEMENT AND SUPPORT APPLICATIONS TO FUNCTIONAL APPLICATIONS

(71) Applicant: International Business Machines Corporation, Armonk, NY (US)

(72) Inventor: Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 14/921,498

(22) Filed: Oct. 23, 2015

(65) Prior Publication Data

US 2017/0118294 A1   Apr. 27, 2017

(51) Int. Cl.
 *H04L 29/08* (2006.01)
 *H04L 12/24* (2006.01)
 *H04L 12/26* (2006.01)

(52) U.S. Cl.
 CPC .......... *H04L 67/141* (2013.01); *H04L 41/046* (2013.01); *H04L 41/0896* (2013.01); *H04L 69/329* (2013.01); *H04L 43/10* (2013.01)

(58) Field of Classification Search
 CPC ...................................................... H04L 43/08
 USPC ......................................................... 709/202
 See application file for complete search history.

(56) References Cited

U.S. PATENT DOCUMENTS

| | | | |
|---|---|---|---|
| 7,260,635 B2 | 8/2007 | Pandya et al. | |
| 7,742,406 B1 | 6/2010 | Muppala | |
| 8,913,501 B2 | 12/2014 | Branch et al. | |
| 2008/0045234 A1* | 2/2008 | Reed | H04W 8/02 455/456.1 |
| 2008/0147845 A1* | 6/2008 | Yoda | H04L 67/22 709/224 |

OTHER PUBLICATIONS

Exinda, Network Control Suite, 2013, 2 pages.

\* cited by examiner

*Primary Examiner* — Vivek Srivastava
*Assistant Examiner* — Sibte H Bukhari
(74) *Attorney, Agent, or Firm* — Jennifer R. Davis; Michael J. Chang, LLC

(57) ABSTRACT

Techniques for reducing interference in a network from management and control traffic to functional applications are provided. In one aspect, a method for regulating information flow between monitoring agents and a management server in a network includes the steps of: inserting an interface in the network to access stream based communications in the network; exporting control and data ports to each of the monitoring agents; receiving requests from one or more of the monitoring agents to establish sessions; and limiting a number of the sessions to open. A system for limiting interference in a network is also provided.

18 Claims, 5 Drawing Sheets

REDUCING INTERFERENCE FROM MANAGEMENT AND SUPPORT APPLICATIONS TO FUNCTIONAL APPLICATIONS

STATEMENT OF GOVERNMENT RIGHTS

This invention was made with Government support under Contract number W911NF-06-3-0001 awarded by Army Research Office (ARO). The Government has certain rights in this invention.

FIELD OF THE INVENTION

The present invention relates to managing network traffic, and more particularly, to techniques for reducing interference in a network from management and control traffic to functional applications.

BACKGROUND OF THE INVENTION

Almost all information technology (IT) environments require the presence of management and support applications. Such applications include network and system management functions. Almost all management and support applications require keeping track of the state of the system which is collected at one (or a few) operation centers (e.g., a Network Operation Centers, NoC or Security Operation Center). As the size of IT environments grows, the amount of traffic flowing to and from the operation centers increases. Frequently, this traffic interferes with the operation of the actual IT applications. For instance, a security data collection or a network monitoring system can degrade the performance of a web-site or transaction processing system which may be running at the same operation center or in a different operation center. With virtualized operations, contention can also arise with other resources in the IT infrastructure, such as shared storage, shared computing capacity, or a shared appliance or device that may be accessed in a virtualized manner.

Current solutions to this problem include creating a new network architecture, e.g., use prioritization and differentiated services in the network, or create a separate network infrastructure for management. However, these solutions require changing the operational nature of the network, and frequently are not usable because of the operational challenges they pose.

Therefore improved techniques for reducing interference from management and support applications to functional applications would be desirable.

SUMMARY OF THE INVENTION

The present invention provides techniques for reducing interference in a network from management and control traffic to functional applications. In one aspect of the invention, a method for regulating information flow between monitoring agents and a management server in a network is provided. The method includes the steps of: inserting an interface in the network to access stream based communications in the network; exporting control and data ports to each of the monitoring agents; receiving requests from one or more of the monitoring agents to establish sessions; and limiting a number of the sessions to open.

In another aspect of the invention, a system for limiting interference in a network is provided. The system includes: a management server; monitoring agents; and an interface in the network for accessing stream based communications in the network, wherein the management server is configured to, upon receipt of requests from one or more of the monitoring agents to establish sessions, use the interface to limit a number of the sessions to open.

A more complete understanding of the present invention, as well as further features and advantages of the present invention, will be obtained by reference to the following detailed description and drawings.

DETAILED DESCRIPTION OF PREFERRED EMBODIMENTS

As highlighted above, system and network management and operation functions are an important aspect of running a large scale enterprise or telecommunications computing infrastructure. As the size and complexity of networks grow, the importance of having these functions and having them to monitor, analyze and react to problems that arise in applications and networks becomes increasingly important. At the same time, one concern that arises is the amount of interference that monitoring and management functions can cause in the actual operation of the infrastructure. As the scalability needs of these support functions grows, the potential of possible interference increases.

Figure 1:
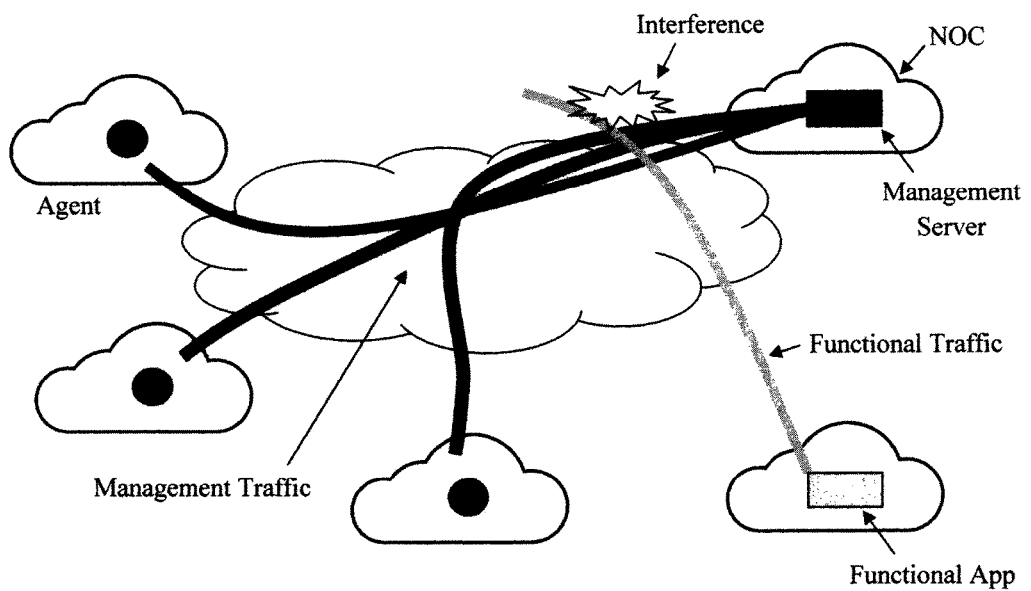
FIG. 1 is a diagram illustrating how management and control traffic interferes with the functional traffic in a network according to an embodiment of the present invention.

Namely, network management and support functions use monitoring agents to collect information from different remote locations in a network. This management and control traffic can interfere with the normal information technology (IT) application (i.e., the functional applications)—which is undesirable. See, for example, FIG. 1 which illustrates how the management traffic (between a management server at the network operations center (NOC) and the remote monitoring agents) interferes with the functional traffic.

To use an illustrative example, consider the operation of an enterprise which has 100,000 employees distributed throughout the world, and each of these employees is using a laptop. Each of the laptops has a monitoring agent which performs health-checks on the laptop and reports the health-check status back to a management server. Typically, all of the management servers are hosted in a central site where management and support operations run. At the same site, it is not uncommon to have other operational systems such as an internal web-site and/or an enterprise directory server hosted at the site.

From the perspective of any single laptop, the traffic generated by the monitoring agent is inconsequential. The monitoring agent traffic does not interfere with the traffic that flows from the local site. However, the net combined effect of all of the management traffic on the central management site can be significant. The total traffic generated flowing to the management server, can easily overwhelm the net bandwidth that is available at the management site. If the management site is co-hosting other applications, such as a webserver, a domain name system (DNS) server or a directory server, this interference would be considered unacceptable.

In an ideal world, the management server could just mark its traffic as being a lower priority than that of the other traffic running in the network, and thus avoid interference with the other traffic. However, network prioritization technology is only implemented very sporadically within the network environment. Typically, most of the traffic in the network flows from the monitoring agent to the management server over the wide area enterprise intranet. Any packet marking done by the monitoring agent is unlikely to survive the transit through the intranet, thereby rendering this solution ineffective.

Another approach that might seem plausible at first, but fails on operational grounds, is the insertion of a network device in the management data center that can enforce such prioritization based on the IP address of the management server that is running. In principle, this network device can sit at the edge of the management data center and enforce prioritization. The problem with this approach is however two-fold. First, the bottleneck where traffic interference may be occurring is not necessarily at the management data center itself, but at a point outside the data center, and the bottleneck point changes over time depending on the network load and topology. Thus, enforcing prioritization at the point of the data center may be completely ineffectual. Second, the networking team and the management application teams are usually in different departments in most enterprises, and an inter-department coordination to maintain consistency in network priority configuration and management application installation is complicated and slow in most enterprises.

This creates a challenge for developers of management systems, who would like to be good citizens and not disturb operational applications, implement a solution that does not require cross-department coordination, and still be able to make good use of the network when capacity is available. Advantageously, provided herein are techniques by which a management and support system can ensure that it is not interfering with the operational applications while at the same time making sure that, if there is no other traffic, the management and support system is using the maximum possible bandwidth (or other resources) that are being shared across different flows. The present solution can be implemented across any management or operational support application which needs to be politer than others. This scheme is what is referred to herein as a polite management system.

As will be described in detail below, the present techniques operate purely at the application level. It is notable that the inverse of this problem, i.e., designing applications which will grab a larger share of the network for themselves, has been addressed. However, a solution which voluntary restricts itself to a lower bandwidth than other competing traffic, does not exist at an application level.

One key challenge in making a polite management system is the fact that network bandwidth consumption conditions and IT resource usage consumptions change dynamically. Thus, anything that puts in static limits does not use the full capacity when it is available. On the other hand, trying to put in another adaptation loop creates undesirable side-effects and wide swings in performance because of interference with existing wide-spread transmission control protocol (TCP) which is putting in an adaptive control of its own. The adaptive loop impacts both network resource consumption, as well as shared infrastructure resource consumption.

The present approach generally involves implementing an application layer protocol over sockets which limits the total number of TCP connections that are active at any time from a management application. By limiting the connection count, and using them as a shared pool of resources, it can be assured that the management system is not interfering with any cross-traffic, and that the system can use the maximum possible bandwidth when there is no cross-traffic.

TCP is a standard network protocol used to transfer data between computers. A standard TCP communication involves two entities, a server and a client. The server will wait for an incoming connection request from the client and, once a connection has been established, the server and the client can both send and receive data. In a network, the application layer is typically run on top of the TCP layer, and specifies the communication protocols and interface methods used in communications. A network socket is the endpoint of a communication across the network. A socket application programming interface or API allows application programs to control network sockets. Each network socket specifies an IP address and a port number (for data packet delivery) and a protocol (i.e., in this case TCP).

According to an exemplary embodiment, a socket layer shim is introduced which restricts the total number of TCP connections in the system to be smaller than the number of TCP connections required for all monitoring agents to communicate with the management server. For example, if there are 1,000 monitoring agents desiring to communicate with the management server, then a provisioning is included for a pool of a much smaller number of connections, e.g. 50 TCP connections to be active at any time. These 50 connections are shared among each of the monitoring agents in order to enable their communication with the management server to happen. The size of the connection pool can be adjusted dynamically up or down within desired limits to manage the performance characteristics of the communication among the monitoring agents.

This approach has many notable benefits: (a) it works in any network environment, (b) it can be implemented incrementally on an application-by-application basis; (c) it does not require any change in the underlying network environment; (d) it allows the management application to be polite and defer to other applications, but does not shut it down completely in the presence of aggressive cross-traffic; (e) it is capable of using the full network capacity if it is the only management application (i.e., when it is the only TCP connection, it can grow to use the full bandwidth available); (f) it can be implemented without requiring major rewriting of existing applications; and (g) it can deal with sharing of other resources like central processing unit (CPU), memory or virtualized resources with other applications.

Figure 2:
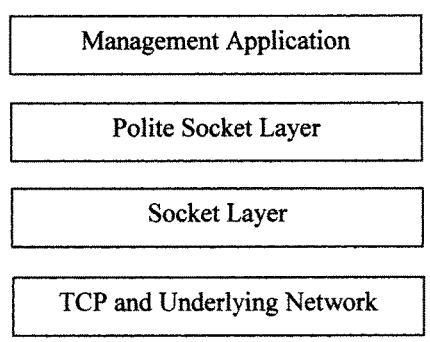
FIG. 2 is a diagram illustrating an overall architecture of the present software system implementing a Polite Socket Layer according to an embodiment of the present invention.

The overall architecture of the software system is depicted in FIG. 2. As shown in FIG. 2, the present Polite Socket Layer is employed as a new software layer run on top of the TCP layer and underlying network. As is known in the art, an interne protocol (IP) network includes a number of layers, often referred to as network layers. The protocols for each layer generally specify their own data format, layout, etc. Like a traditional socket interface, the present Polite Socket Layer provides a uniform API to the underlying layers of the network, such as the TCP layer, and is implemented at the application level—along with the Socket Layer to the Management Application. See FIG. 2. Preferably, the Polite Socket Layer exports the same API as the Socket Layer to the Management Application. As a result, the Polite Socket Layer can be linked into any existing applications without requiring a rewriting of the application.

The Polite Socket Layer is implemented, like other distributed applications, to have a client part and a server part. The server listens on two ports, a control port and a data port. On the control port, the clients only send updates on the amount of data they have for communication. On the data port, the actual communication happens.

The size of the TCP connections on the data port is limited in order to restrict the number of TCP sessions which have the data flow to be sent. The control port does not have that restriction. However, the connections on the control port are not used for large data flow, but only for limited data exchange. These connections on the control port can either be kept open for a long time with limits on bandwidth used by each connections, or an aggregate limit on bandwidth, or they can be established and disconnected as needed for communication between the client and the server. As will be described in detail below, the activity on the control port connection is an exchange of tokens.

Figure 3:
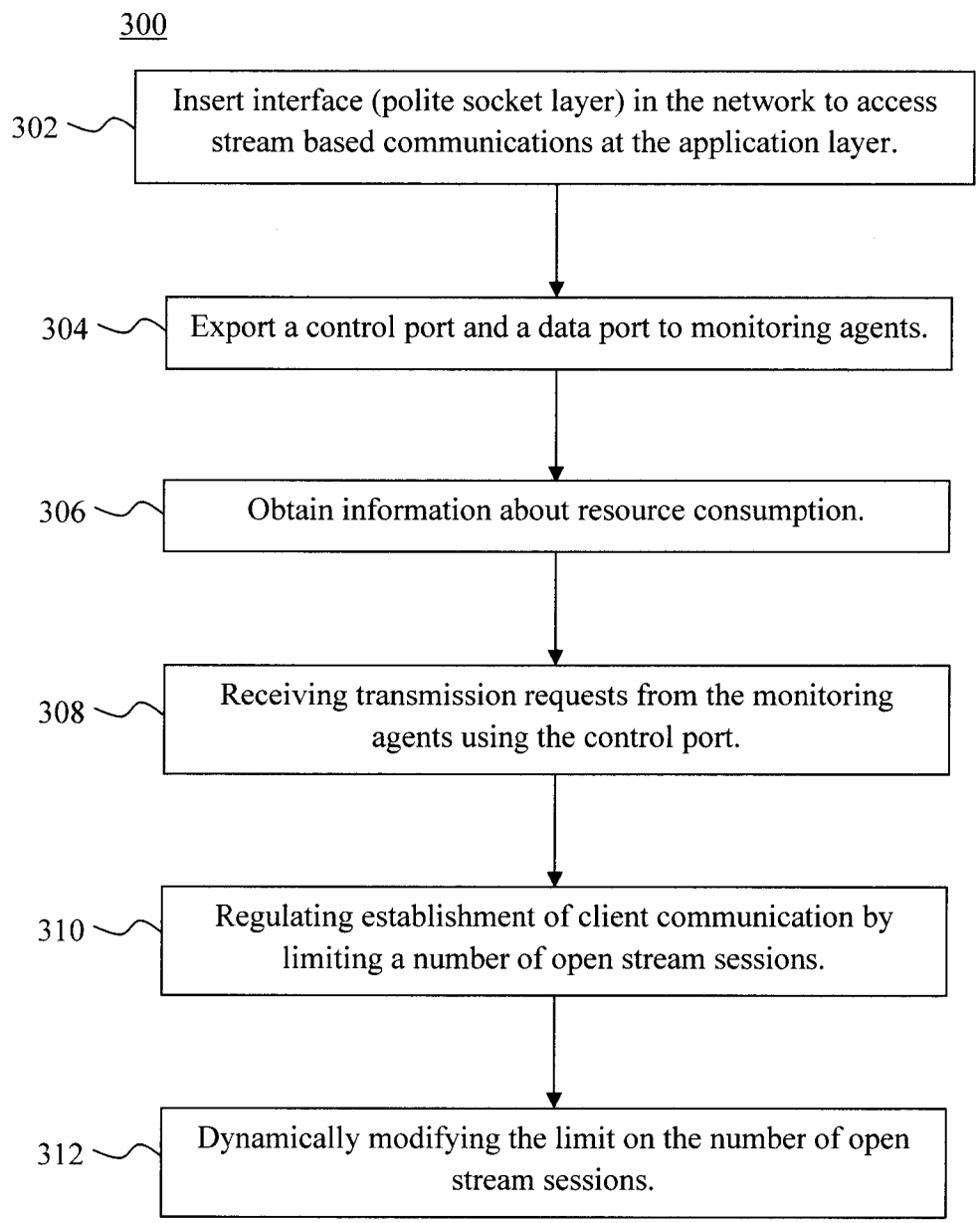
FIG. 3 is a diagram illustrating an exemplary methodology for regulating information flow between network monitoring agents and a management server according to an embodiment of the present invention.

FIG. 3 is a diagram illustrating an exemplary methodology 300 for regulating information flow between monitoring agents and a management server in a network. In step 302, an interface is inserted at the application layer to access stream based communications in the network. As provided above (see, for example, FIG. 2) the interface is a Polite Socket Layer run on top of the TCP layer and underlying network. According to an exemplary embodiment, the steps of methodology 300 are performed by a management server (such as apparatus 600—see below). Thus, in step 302, it is the management server that establishes the Polite Socket Layer in the IP network.

In step 304, the management server exports a control port and a data port to each of the monitoring agents via the Polite Socket Layer. As described above, the monitoring agents use the control port to send updates on the amount of data they have for communication. While there are no restrictions on the TCP connections on the control port, the control ports are used only for limited data exchange. On the other hand, the actual communication between the management server and the monitoring agents occurs on the data ports and, accordingly, restrictions are placed on the size of the TCP connections on the data ports. This is to ensure that the management and control traffic does not interfere with the functional traffic.

To do so, the management server will regulate the number of open stream sessions on the data ports. The limit the management server places on the number of open stream sessions can be based, for example, on the amount of current resource consumption and, as will be described in detail below, can be modified dynamically depending on changes in the network conditions.

Thus, in step 306, the management server can (optionally) obtain information about resource consumption in the network. For instance, the resource consumption data can relate to current consumption in a virtualized environment, e.g., how many active virtual machines, total memory utilization, or storage resources are being used in a virtualized cloud computing infrastructure—also referred to herein as virtual resource consumption. This data can be combined into a numeric score, or can be used to define the system in various levels of consumption depending on whether the numeric score exceeds a predefined set of thresholds.

As described above, the management server receives a request(s) on the control port from one or more of the monitoring agents to establish a session. See step 308. The request will include an amount of data the monitoring agent wants to communicate to the management server. However, no data other than the request to establish a session with the management server occurs on the control ports. Therefore, since the control ports are used only for limited data exchange, there is not a need to regulate communications via the control ports.

However, the actual communication via the data ports is regulated by the management server in step 310 by limiting the number of open stream sessions it opens. According to an exemplary embodiment, a token-based system is used by the management server to regulate the number of open sessions based on a pool of available tokens which represents a total number of available sessions. See below.

As highlighted above, it is preferable to be able to adapt to changing network traffic conditions such that the maximum resources can be leveraged for management and control traffic when the functional traffic drops. Thus, in step 312, the limit set by the management server regarding the available pool of tokens/available sessions can be modified dynamically based on changes in the network traffic. For instance, at lower traffic times the management server can increase the limit on the number of open stream sessions it can allocate to the monitoring agents. As an example, a management server could collect the count of management clients that are waiting to send management information to it but waiting because tokens/sessions are not available, and increase the tokens/sessions limit if this count exceeds a threshold. Similarly, if a time threshold passes where there is no management client who needed to wait for a session establishment, the limit on tokens/sessions can be reduced.

Figure 4:
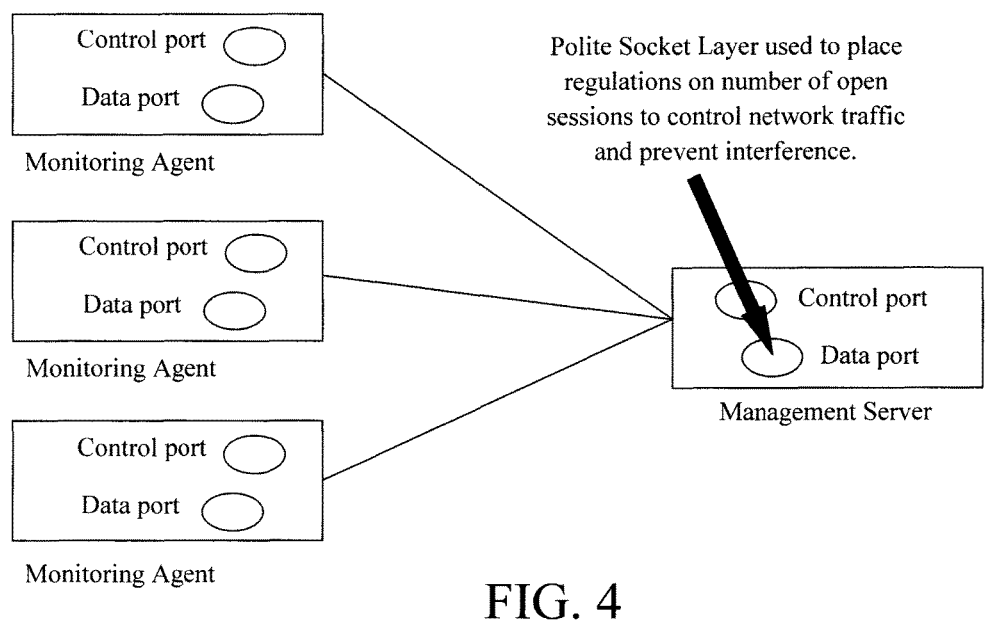
FIG. 4 is a diagram illustrating an exemplary architecture of the polite socket layers when physically implemented in a network according to an embodiment of the present invention.

Based on the above description, FIG. 4 provides an example architecture of the polite socket layers when physically implemented in a network. As shown in FIG. 4, (as per step 304 of methodology 300) both a control port and a data port are established, through which the monitoring agents can exchange data with the management server. Further, as shown in FIG. 4, (as per step 310 of methodology 300) the Polite Socket Layer is employed to place restrictions on the data port as to the number of open sessions.

According to an exemplary embodiment, a token-based system is used by the management server to regulate the number of open sessions vis-à-vis the monitoring agents based on a total number of available sessions (which, as provided above, can change dynamically based on network traffic conditions). A token bucket concept is known in the art, and follows the basic premise that one must possess the necessary number of tokens in order to be permitted to transmit one's data. See, for example, U.S. Pat. No. 8,913, 501 issued to Branch et al., entitled "Efficient Urgency-Aware Rate Control Scheme for Multiple Bounded Flows," the contents of which are incorporated by reference as if fully set forth herein.

In the instant case, the token concept can be implemented as follows: the management server manages the total pool of tokens and, upon receipt of a request on the control port from a monitoring agent(s), will dole out the tokens. The monitoring agents can only establish a connection on the data port if they are in possession of a token (which they 'cash in' to establish the session). Otherwise, the monitoring agent will have to wait until free tokens are available (e.g., by the closing of existing sessions and/or by enlargement of the available token pool). This process is now described in further detail by way of reference to FIG. 5.

Figure 5:
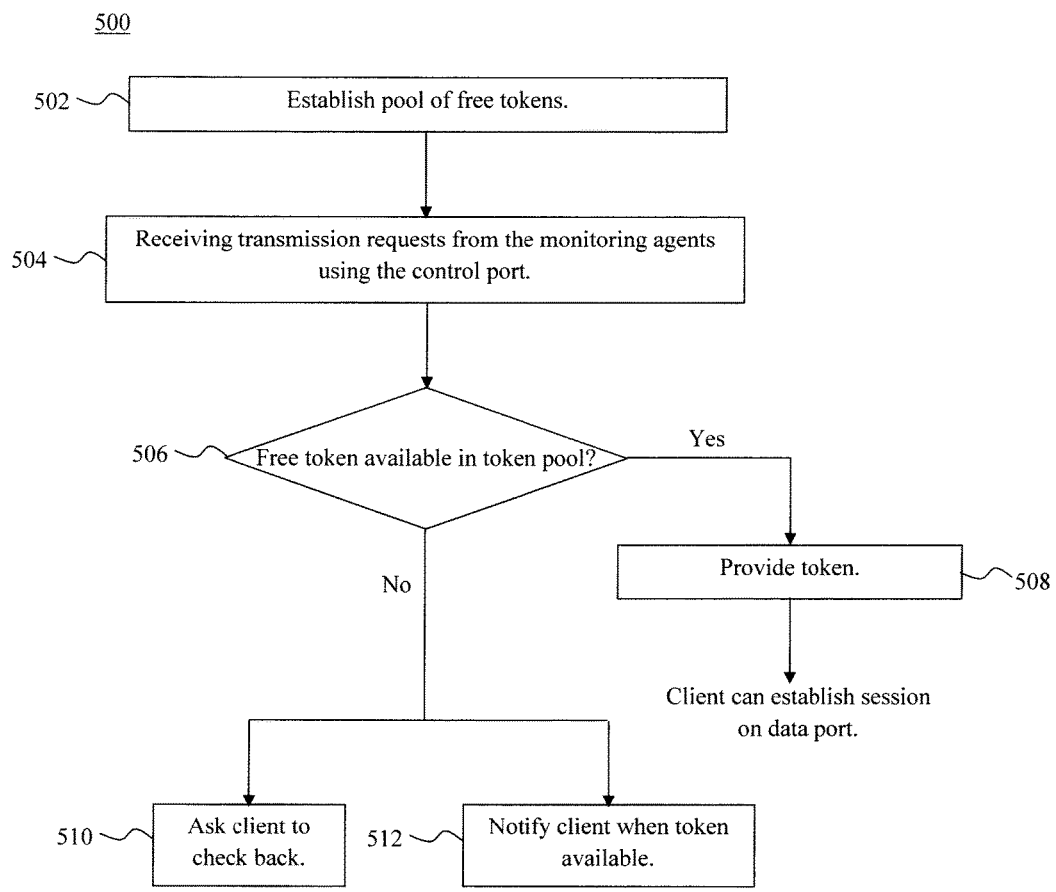
FIG. 5 is a diagram illustrating an exemplary methodology for token-based regulation of network traffic according to an embodiment of the present invention.

FIG. 5 is a diagram illustrating an exemplary methodology 500 for token-based regulation of communications on the data port. By way of example only, methodology 500 provides one scenario contemplated herein for performing step 310 of methodology 300 for limiting the number of open stream sessions.

In step 502, the management server establishes a pool of free tokens. As provided above, the pool of free tokens correlates with a total number of open sessions the management server will establish with the monitoring agents. To use the simple example provided above, if there are 1,000 monitoring agents desiring to communicate with the management server, then a pool of a much smaller number of connections, e.g., 50 TCP connections, can be chosen to be active at any time. By way of the present token system, these 50 connections are shared amongst the monitoring agents. As also provided above, the management server may use information about virtual resource consumption in order to determine the limits on how many open stream sessions it should maintain.

In step 504, a request to establish a session is received (at the control port) of the management server. As provided above, due to the limited amount of data exchanged via the control port (which basically amounts to just the requests to establish a session), there is no regulation on the number of communications to the control port. Thus, requests may come in even if there are no tokens available. Therefore, in step 506, the management server determines whether (or not) there are free tokens available in the pool. Essentially, this equates to determining whether the limit of open sessions on the data port has been reached (or not).

If it is determined that (yes) there are free tokens available (i.e., the limit on the number of open sessions has not been reached), then in step 508 a token is provided to the monitoring agent, and a session can be established with the management server (via the data port). On the other hand, if it is determined in step 506 that (no) there are no free tokens available, then connection with the data port is denied, and a number of actions can be taken. For instance, in step 510, the management server can request that the client/monitoring agent check back later (e.g., after a predetermined period of time) to see if free tokens have become available. Tokens can become available for instance when a session is closed. Namely, once a session has closed, the token (cashed in to open the session) can be returned to the free token pool). Additionally, the size of the free token pool (i.e., the number of free tokens) can be increased by the management server based, for example, on a decreased amount of network traffic. Namely, if the amount of functional traffic has diminished, then the network can handle a greater amount of monitoring and control traffic (implemented by increasing the free token pool).

Alternatively (or in addition to) asking the client to check back later, in step 512 the management server might proactively take steps to notify the monitoring agent when free tokens become available. In that case, the monitoring agent can simply be told that they will receive a notification from the management server when free sessions are available. Further, it may be the case that the monitoring agent/client intends to check back later (as per step 510). The management server can however alert the monitoring agent if free tokens become available in the mean time (as per step 512).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
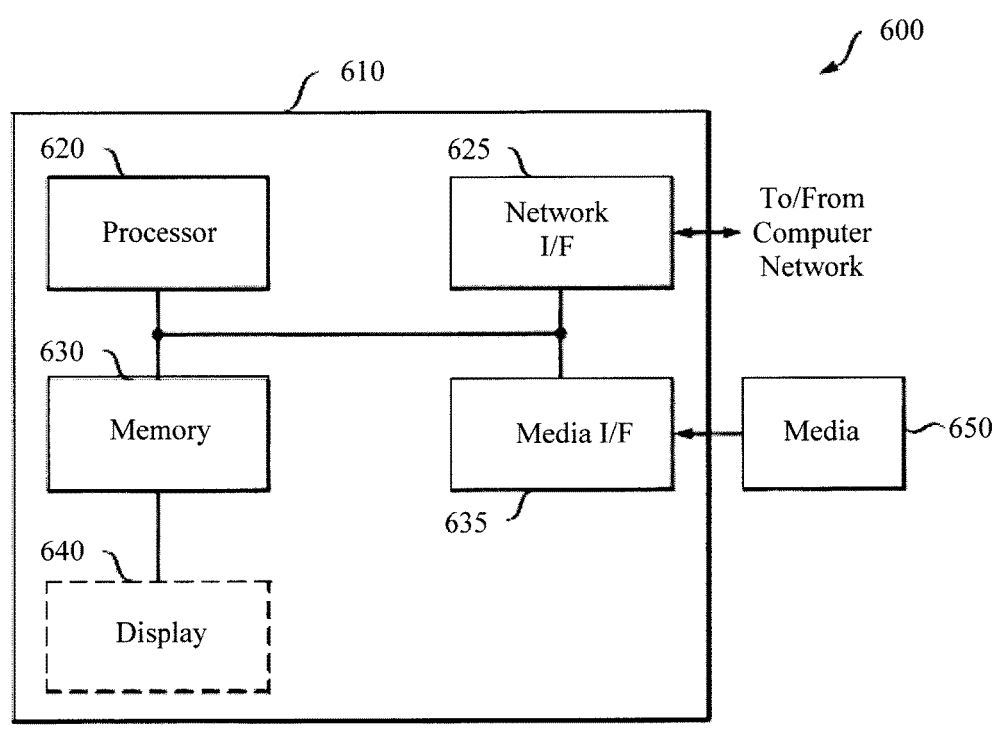
FIG. 6 is a diagram illustrating an exemplary apparatus for performing one or more of the methodologies presented herein according to an embodiment of the present invention.

Turning now to FIG. 6, a block diagram is shown of an apparatus 600 for implementing one or more of the methodologies presented herein. By way of example only, apparatus 600 can be configured to implement one or more of the steps of methodology 300 of FIG. 3 and/or one or more of the steps of methodology 500 of FIG. 5.

Apparatus 600 includes a computer system 610 and removable media 650. Computer system 610 includes a processor device 620, a network interface 625, a memory 630, a media interface 635 and an optional display 640. Network interface 625 allows computer system 610 to connect to a network, while media interface 635 allows computer system 610 to interact with media, such as a hard drive or removable media 650.

Processor device 620 can be configured to implement the methods, steps, and functions disclosed herein. The memory 630 could be distributed or local and the processor device 620 could be distributed or singular. The memory 630 could be implemented as an electrical, magnetic or optical memory, or any combination of these or other types of storage devices. Moreover, the term "memory" should be construed broadly enough to encompass any information able to be read from, or written to, an address in the addressable space accessed by processor device 620. With this definition, information on a network, accessible through network interface 625, is still within memory 630 because the processor device 620 can retrieve the information from the network. It should be noted that each distributed processor that makes up processor device 620 generally contains its own addressable memory space. It should also be noted that some or all of computer system 610 can be incorporated into an application-specific or general-use integrated circuit.

Optional display 640 is any type of display suitable for interacting with a human user of apparatus 600. Generally, display 640 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for regulating information flow between monitoring agents and a management server in a network, the method comprising the steps of:
   inserting an interface in the network to access stream based communications in the network;
   exporting control and data ports to each of the monitoring agents;
   receiving requests from one or more of the monitoring agents to establish sessions;
   limiting a number of the sessions to open by limiting the connections on the data ports without restricting connections on the control ports, whereby a connection pool is provisioned containing less than a number of connections needed for all of the monitoring agents to communicate with the management server, and wherein the connection pool is shared among the monitoring agents; and
   dynamically modifying a limit on the number of sessions to open based on changes in network traffic by reducing the limit after a given time threshold passes with none of the monitoring agents waiting to send management information to the management server.

2. The method of claim 1, wherein the interface inserted in the network is a socket layer.

3. The method of claim 1, wherein the interface is inserted in an application layer of the network.

4. The method of claim 1, wherein the steps of claim 1 are performed by the management server.

5. The method of claim 1, further comprising the step of:
obtaining information about resource consumption in the network.

6. The method of claim 1, wherein the requests are received on a control port of the management server.

7. The method of claim 1, wherein the requests comprise an amount of data the monitoring agents want to communicate to the management server.

8. The method of claim 1, wherein the step of limiting the number of the sessions to open, comprises the steps of:
establishing a pool of tokens representing a total number of the sessions to open;
upon receipt of the requests, determining whether free tokens are available in the pool of tokens; and
providing tokens to the monitoring agents and establishing a session on the data ports if free tokens are available, otherwise denying connection.

9. The method of claim 8, wherein free tokens are unavailable, the method further comprising the step of:
requesting the monitoring agents to check back after a certain period of time to see if free tokens have become available.

10. The method of claim 8, wherein free tokens are unavailable, the method further comprising the step of:
notifying the monitoring agents when free tokens become available.

11. A computer program product for regulating information flow between monitoring agents and a management server in a network, the computer program product comprising a non-transitory computer readable storage medium having program instructions embodied therewith, the program instructions executable by a computer to cause the computer to:
insert an interface in the network to access stream based communications in the network;
export control and data ports to each of the monitoring agents;
receive requests from one or more of the monitoring agents to establish sessions;
limit a number of the sessions to open by limiting the connections on the data ports without restricting connections on the control ports, whereby a connection pool is provisioned containing less than a number of connections needed for all of the monitoring agents to communicate with the management server, and wherein the connection pool is shared among the monitoring agents; and
dynamically modify a limit on the number of sessions to open based on changes in network traffic by reducing the limit after a given time threshold passes with none of the monitoring agents waiting to send management information to the management server.

12. The computer program product of claim 11, wherein the interface is inserted in an application layer of the network.

13. The computer program product of claim 11, wherein the requests are received on a control port of the management server.

14. The computer program product of claim 11, wherein the program instructions, when limiting the number of the sessions to open, further cause the computer to:
establish a pool of tokens representing a total number of the sessions to open;
upon receipt of the requests, determine whether free tokens are available in the pool of tokens; and
provide tokens to the monitoring agents and establishing a session on the data ports if free tokens are available, otherwise denying connection.

15. The computer program product of claim 14, wherein free tokens are unavailable, and wherein the program instructions further cause the computer to:
request the monitoring agents to check back after a certain period of time to see if free tokens have become available.

16. The computer program product of claim 14, wherein free tokens are unavailable, and wherein the program instructions further cause the computer to:
notify the monitoring agents when free tokens become available.

17. A system for limiting interference in a network, the system comprising a processor device coupled to a memory, the processor device being operable to:
insert an interface in the network to access stream based communications in the network;
export control and data ports to each of the monitoring agents; and
upon receipt of requests from one or more of the monitoring agents to establish sessions, use the interface to limit number of the sessions to open by limiting the connections on the data ports without restricting connections on the control ports, whereby a connection pool is provisioned containing less than a number of connections needed for all of the monitoring agents to communicate with the management server, wherein the connection pool is shared among the monitoring agents, and dynamically modify a limit on the number of sessions to open based on changes in network traffic by reducing the limit after a given time threshold passes with none of the monitoring agents waiting to send management information to the management server.

18. The system of claim 17, wherein the interface is a socket layer inserted in an application layer of the network.

* * * * *